Aug. 19, 1958

A. N. McGURK 2,848,216

SHOCK ABSORBING ATTACHMENT FOR THROTTLE
RODS AND THE LIKE

Filed Jan. 11, 1955

INVENTOR.
ALFRED N. McGURK

BY Bertha L. MacGregor
ATTORNEY

surface of the head 21 and the casing 10 for reception of the end coil of the spring 19.

United States Patent Office 2,848,216
Patented Aug. 19, 1958

2,848,216

SHOCK ABSORBING ATTACHMENT FOR THROTTLE RODS AND THE LIKE

Alfred N. McGurk, Denver, Colo.

Application January 11, 1955, Serial No. 481,094

2 Claims. (Cl. 267—1)

This invention relates to a shock absorbing attachment for throttle actuating and control rods of motor vehicles and the like. The device may be built in as part of a throttle rod or may be made separately and sold as an accessory for installation in existing throttle rods in motor vehicles and the like.

The main object of the invention is to provide means in a throttle rod or the like, intermediate the conventional actuating lever and the throttle, for yieldingly transmitting motion through the rod to the throttle, to prevent breakage and other injury to the throttle rod and associated parts.

Another object is to provide a device of the character described which is compact, durable, and dependable in operation. Another object is to provide means for preventing dirt or foreign matter from entering the housing and from interfering with the efficient operation of the attachment.

These and other objects and advantages will be apparent from the drawings and the following specification.

Figure 1:
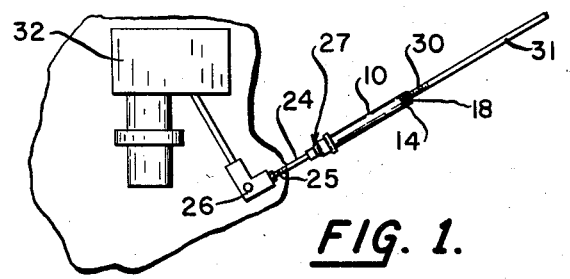
Fig. 1 is an elevational view of the shock absorbing attachment embodying my invention, installed in a throttle rod, showing diagrammatically a carburetor to which the rod is attached.
Figure 2:
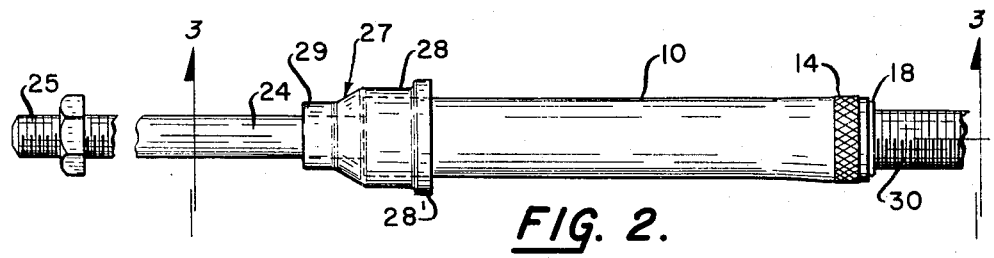
Fig. 2 is an elevational view of the shock absorbing attachment.
Figure 3:
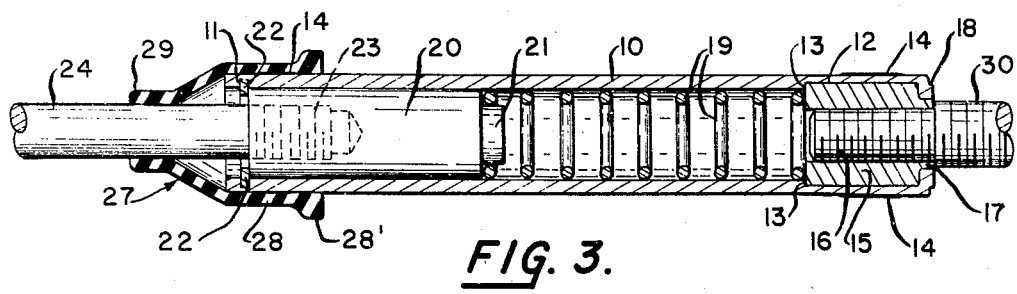
Fig. 3 is a sectional view, on an enlarged scale, in the plane of the line 3—3 of Fig. 2.

In the preferred embodiment of my invention shown in the drawings, the shock absorbing attachment comprises a cylindrical hollow casing 10. Initially the casing 10 is of uniform external diameter throughout its length and open at each end. Near one end it is internally grooved as indicated at 11, and at the opposite end the casing 10 is internally reamed on the annular surface 12, from the shoulder 13 to the outer edge of the casing. The casing 10 preferably is made of aluminum and is knurled on its outer surfaces near each end as indicated at 14.

A metal plug 15 fits snugly in the reamed end of the casing 10, between the annular shoulder 13 and the end of the casing. Said plug 15 is centrally bored and threaded as indicated at 16. At the outer end, the plug 15 is cut away circumferentially at 17, and since the axial length of the plug is slightly less than that of the reamed surface 12, the end 18 of the casing extends beyond the plug 15 and is pressed inwardly to occupy the annular space 17. Thus the plug is firmly retained in the cylindrical casing 10 between the shoulder 13 and inturned end 18.

A coiled spring 19 occupies the space in the casing 10 adjacent the inner end of the plug 15, and is axially compressible between said plug 15 and a second plug 20. The body of the plug 20 fits slidingly in the cylindrical casing 10 and on its inner face is provided with a head 21 of smaller diameter than the body of the plug 20, whereby there is provided an annular space between the peripheral surface of the head 21 and the casing 10 for reception of the end coil of the spring 19.

The plug 20 is retained in the casing 10 by a ring 22 which is snapped into the groove 11. The outer end of the plug 20 is centrally bored and screw threaded as indicated at 23 to receive the threaded end of a rod 24 preferably made of steel. The rod 24 projects outwardly beyond the open end of the casing 10 and has threads 25 formed on its free end for cooperation with means for connecting the attachment to a throttle rod connector such as the one indicated at 26 in Fig. 1.

A rubber sleeve 27 covers the open end of the casing 10, having a body portion 28, thickened at 28', which snugly engages the outer surface of the casing, and a reduced portion 29 which surrounds the rod 24, and prevents dirt from entering the casing.

As an attachment, the device described may be provided with a removable screw threaded rod 30 having one end threaded for engagement with the threads 16 of the plug 15 and the other end, of larger diameter, threaded for connection with a throttle control rod connector (not shown). As shown in Fig. 1, the rod 30 is a part of the conventional throttle control rod 31.

From the foregoing description, the operation of the device will be understood without further elaboration. When the throttle control rod 30—31 is moved longitudinally by actuating a conventional foot lever, the casing 10 and parts therein also move longitudinally, bodily with the rod. The plug 20 and attached rod 24 resist the transmitted movement, and because of the sliding relationship between the plug 20 and casing 10, the spring 19 is compressed between the plugs 15 and 20, and longitudinal movement is yieldingly transmitted to the rod 24. The degree of compression of the spring depends on the resistance offered by the operative parts of the installation between the operating lever and the throttle mechanism.

As shown in Fig. 1, the rod 24 actuates a throttle rod connected to the carburetor indicated diagrammatically at 32.

Throttle rods in motor vehicles are relatively light in weight and small in diameter, and particularly those installed in trucks and heavy duty vehicles heretofore have been subject to breakage and other injury. My shock absorbing device, whether built in or installed as an attachment, has eliminated breakage without substantial increase in the weight of the rod. This has been achieved by the design and construction of the device as well as the choice of materials, namely, the use of aluminum or other light weight metal for the casing 10 and plug 15, and steel or other suitable material for the movable plug 20.

There has been illustrated and described the preferred embodiment of the invention, but it should be understood that the invention is not limited to the construction shown and described, for it will be obvious to those skilled in the art that changes and modifications may be made without departing from the invention in its broader aspects. It is, therefore, intended in the appended claims to cover all such changes and modifications as fall within the spirit and scope of the invention.

I claim:

1. A shock absorbing attachment for throttle rods and the like of motor vehicles, comprising a cylindrical casing of light weight material, the inner surface of the casing being reamed and reduced in thickness adjacent one end, an annular shoulder at the inner end of the said reamed portion, an internally screw threaded plug press fitted into the reamed end of the casing and bearing against said shoulder, the outer end of the plug being cut away peripherally, the outer circumferential edge of the casing being inturned flush with the plug end and occupying the space formed by the cutting away of the plug end, a first rod having a reduced threaded end engaging the threaded plug, the end surface of the rod adjacent said reduced end bearing against the plug, resilient means in the casing adjacent the inner end of the plug, a second internally threaded plug slidable axially in the casing, an annular groove on the inner surface of the casing at the end adjacent said slidable plug, a ring fitted into said groove and projecting inwardly beyond the casing surface into contact with the end surface of the slidable plug, and a second rod having a threaded end engaging the said second plug and extending outwardly from the casing in axial alignment with said first rod.

2. The shock absorbing attachment defined by claim 1, in which the resilient means is a coiled spring and the slidable plub has a reduced diameter inner end extending axially into said spring.

References Cited in the file of this patent

UNITED STATES PATENTS

| | | |
|---|---|---|
| 919,871 | Ingram et al. | Apr. 27, 1909 |
| 1,203,184 | Clark | Oct. 31, 1916 |
| 1,934,580 | Woolson | Nov. 7, 1933 |
| 2,126,703 | Schmidt | Aug. 16, 1938 |
| 2,595,642 | Daland | May 6, 1952 |
| 2,608,403 | Luther | Aug. 26, 1952 |
| 2,640,693 | Magrum | June 2, 1953 |
| 2,685,873 | Cooke | Aug. 10, 1954 |

FOREIGN PATENTS

| | | |
|---|---|---|
| 461,435 | France | Dec. 29, 1913 |